(12) United States Patent
Chang (10) Patent No.: US 7,089,147 B1
(45) Date of Patent: Aug. 8, 2006

(54) WIRELESS TIRE-PRESSURE MONITOR

(76) Inventor: Hung-Sen Chang, No. 7, Ming Sheng Rd., Feng Shan City, Kaohsiung Hsien (TW)

(*) Notice: Subject to any disclaimer, the term of this patent is extended or adjusted under 35 U.S.C. 154(b) by 0 days.

(21) Appl. No.: 11/046,785

(22) Filed: Feb. 1, 2005

(51) Int. Cl.
*B60C 23/00* (2006.01)

(52) U.S. Cl. .............................. 702/138; 701/2; 701/29; 73/146.4; 73/146.5; 73/146.8; 340/442; 340/447

(58) Field of Classification Search ................ 702/138; 701/1, 3, 16, 36, 29, 2, 33; 73/146.5, 146.2, 73/146.8, 146.4; 340/442, 447
See application file for complete search history.

(56) References Cited

U.S. PATENT DOCUMENTS

| | | | | |
|---|---|---|---|---|
| 5,335,540 A | * | 8/1994 | Bowler et al. | 73/146.5 |
| 5,483,827 A | * | 1/1996 | Kulka et al. | 73/146.5 |
| 5,569,848 A | * | 10/1996 | Sharp | 73/146.2 |
| 5,774,048 A | * | 6/1998 | Achterholt | 340/447 |
| 6,486,771 B1 | * | 11/2002 | Fuller et al. | 340/442 |

* cited by examiner

*Primary Examiner*—Bryan Bui
*Assistant Examiner*—Hien Vo
(74) *Attorney, Agent, or Firm*—Hershkovitz & Associates; Abe Hershkovitz (57) ABSTRACT

A wireless tire-pressure monitor mainly has a cylindrical body, a seal assembly, a screw and a sensor. The cylindrical body is mounted through a hole in a wheel rim wall and has an air passage, an interior thread defined in the air passage and a flange formed around the body. The seal assembly is mounted around the body on opposite sides of the wheel rim wall and abuts the flange on the body. The screw is screwed into the air passage and squeezes the seal assembly against the wheel rim wall. The sensor is mounted on the body. Therefore, the wireless tire-pressure monitor is easily and securely attached to the wheel rim to detect pressure and temperature of the wheel. Further, the sensor is positioned outside of the wheel rim to prevent the wireless detecting signals from being interfered by the wheel rim or wheel.

7 Claims, 13 Drawing Sheets

WIRELESS TIRE-PRESSURE MONITOR

BACKGROUND OF THE INVENTION

1. Field of the Invention

The present invention relates to a wireless tire-pressure monitor, and more particularly to a wireless tire-pressure monitor that is easily and securely attached to a wheel rim and a sensor for detecting tire pressure and temperature positioned outside of the wheel rim to prevent the wireless detecting signals from being interfered by the wheel rim and the wheel.

2. Description of Related Art

A tire-pressure detector or monitor is mounted on each wheel to detect the wheel's pressure or temperature. Therefore, the driver can monitor the status of each wheel to increase driving safety.

Figure 12:
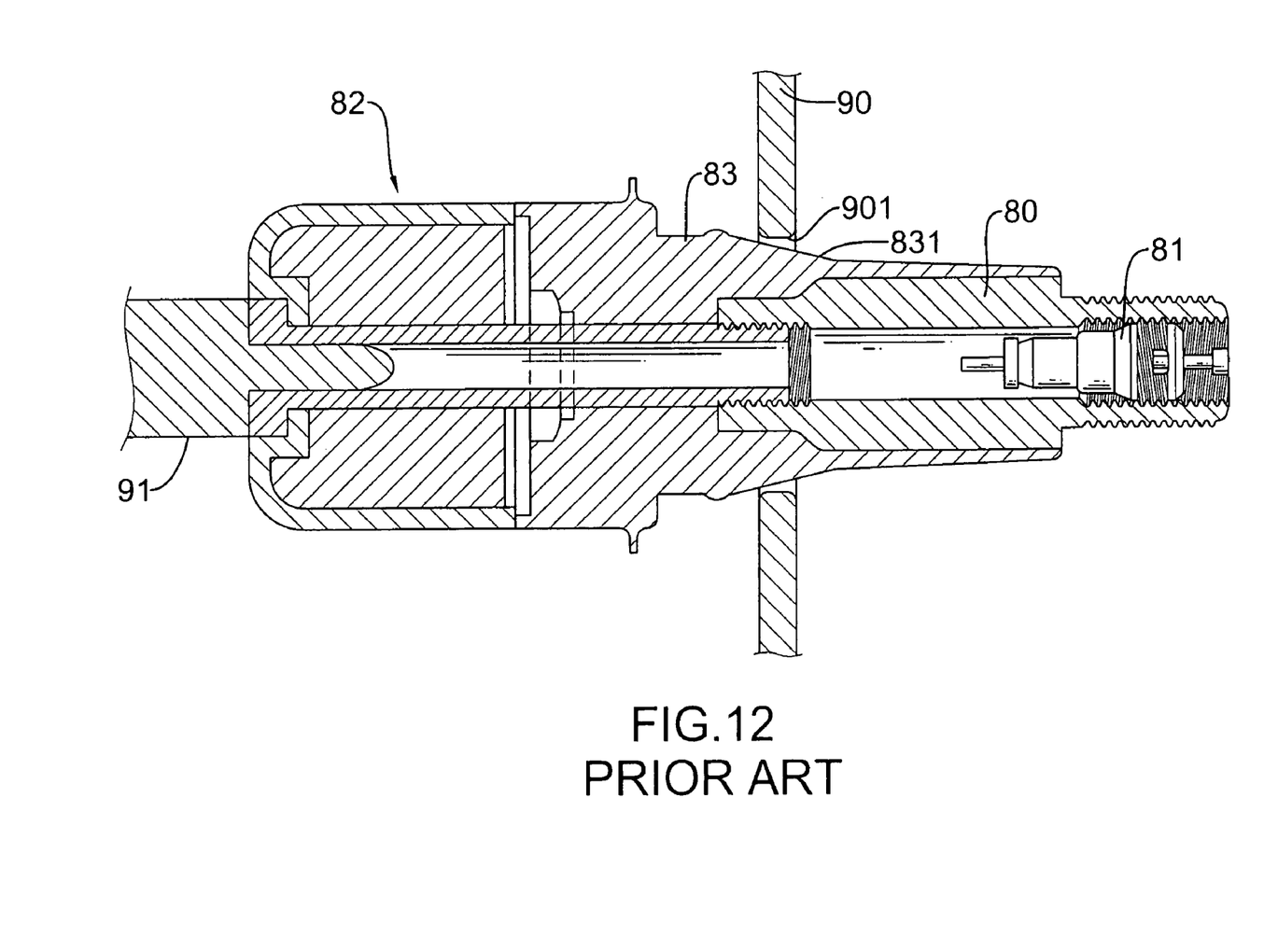
FIG. 12 is a cross sectional side view of a conventional tire valve in accordance with the prior art.

With reference to FIG. 12, a conventional tire valve capable of sensing and transmitting tire pressure includes a body (80), a valve core (81), a detector (82) and a resilient outer cover (83). The body (80) has two opposite ends. The detector (82) is screwed onto one end of the body (80). The resilient outer cover (83) covers the body (80) and the detector (82), holds the tire valve in an opening (901) in a wheel rim (90) and has a tapered outer surface (831). A tool (91) inserted into the free end of the detector (82) pushes the tapered outer surface of the resilient cover (83) into a hole in the wheel rim (90) until the resilient cover (83) attaches to the wheel rim (90). The valve core (80) is positioned outside of the wheel rim (90) and the detector (82) is positioned inside of the wheel rim (90).

However, the conventional tire valve deteriorates from heat and the environment and eventually breaks off the wheel rim or must be replaced. When the tire valve must be replaced, the device to sense tire pressure must also be replaced. Again, since the detector (82) of the tire valve positioned inside of the wheel rim (90), the intensity of the wireless detecting signals from the detector (82) will be decreased or interfered by the wheel rim (90) and the wheel (not shown).

Figure 13:
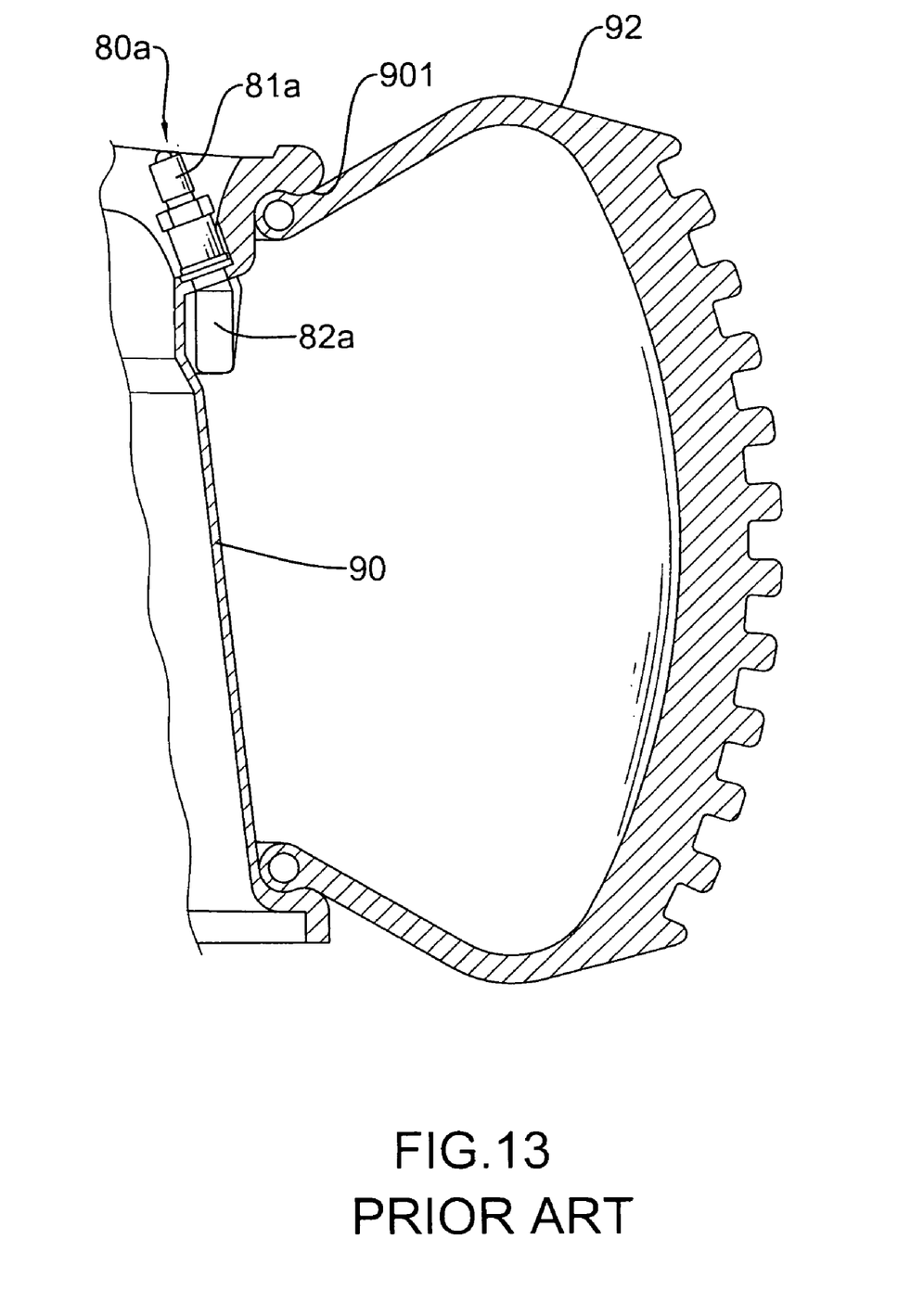
FIG. 13 is a cross sectional side view of another conventional tire valve attached on a wheel rim with a wheel.

With reference to FIG. 13, another tire valve (80a) is attached to a wheel rim (90) with a wheel (92). A detector (82a) is positioned inside of the wheel rim (90) and the valve core (81a) is positioned outside of the wheel rim (90). Before the wheel (92) attached to the wheel rim (90), the tire valve (80a) is first setup on the wheel rim (90). Since the wheel (92) is attached to or detached from the wheel rim (90) along the periphery (901) of the wheel rim (901) by a specific machine (not shown), the detector (82a) of the tire valve could be damaged. Therefore, the conventional tire valve shown in FIG. 12 could be damaged by attaching or detaching the wheel (92).

Therefore, the present invention provides a wireless tire-pressure monitor that is easily and securely to a wheel rim and is not easy damaged during attaching or detaching a wheel procedure.

SUMMARY OF THE INVENTION

The main objective of the present invention is to provide a wireless tire-pressure monitor that is easily and securely attached to a wheel rim to monitor tire pressure or temperature, is positioned outside of a wheel rim to prevent wireless detecting signals from being interfered by the wheel rim and the wheel, and is not easy damaged during attaching or detaching wheel procedure.

A wireless tire-pressure monitor in accordance with the present invention mainly has a cylindrical body, a seal assembly, a screw and a sensor. The cylindrical body is mounted through a hole in a wheel rim wall and has an air passage, an interior thread defined in the air passage and a flange formed around the body. The seal assembly is mounted around the body on opposite sides of the wheel rim wall and abuts the flange on the body. The screw is screwed into the air passage and squeezes the seal assembly against the wheel rim wall. The sensor is mounted on the body. Therefore, the wireless tire-pressure monitor is easily and securely attached the wheel rim to detect pressure and temperature of the wheel and the sensor is positioned outside of the wheel rim.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
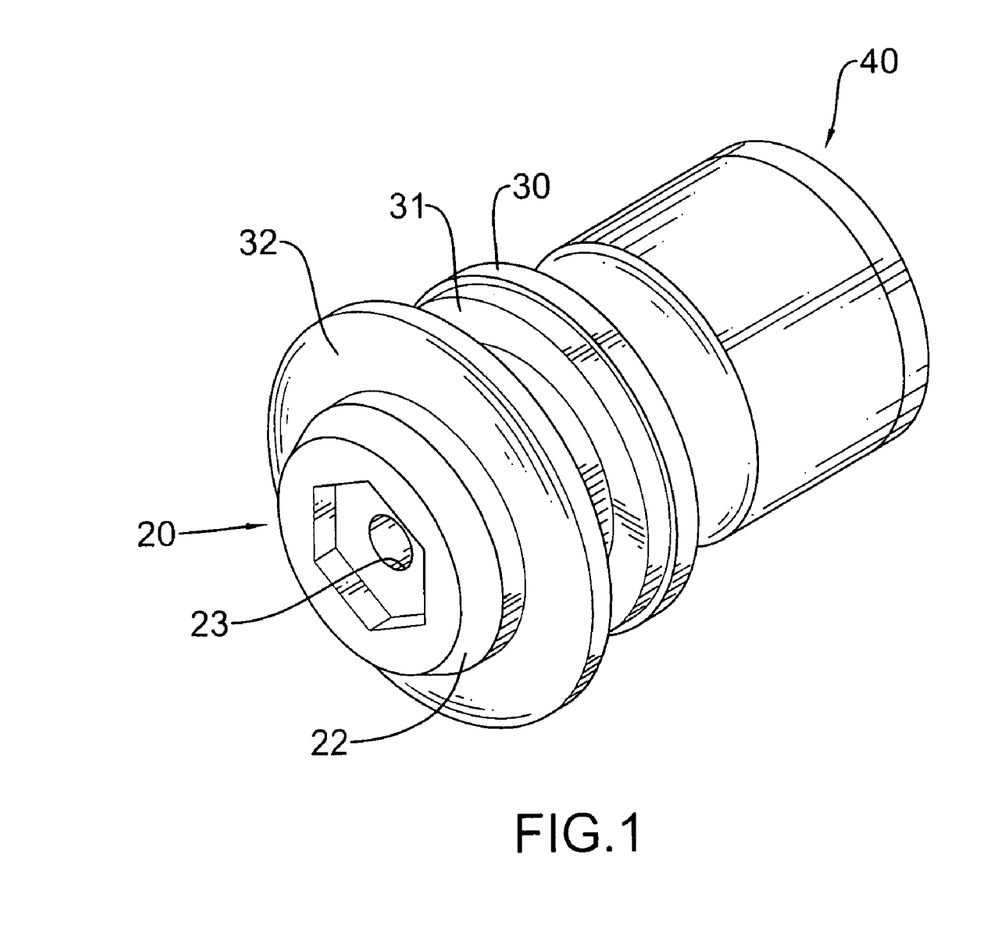
FIG. 1 is a perspective view of a first embodiment of a wireless tire-pressure monitor in accordance with the present invention.
Figure 2:
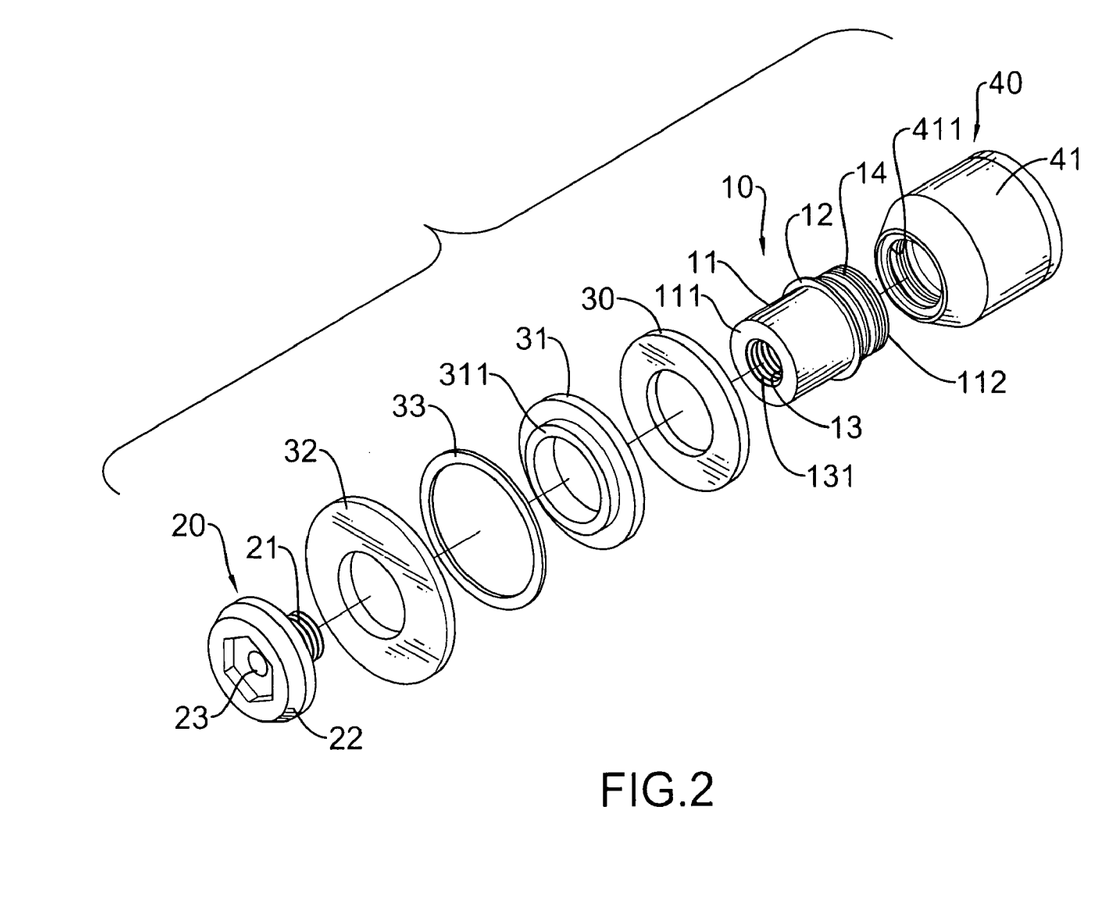
FIG. 2 is an exploded perspective view of the wireless tire-pressure monitor in FIG. 1.

With reference to FIGS. 1 and 2, a first embodiment of a wireless tire-pressure monitor in accordance with the present invention includes a body (10), a seal assembly, a screw (20), and a sensor (40).

The body (10) is cylindrical and made of metal material. The body (10) has an outside surface (11), an inside end (111), an outside end (112), exterior ribs (14), a flange (12) and an air passage (13). The exterior ribs (14) are formed on the outside surface (11) at the outside end (112). The flange (12) is formed around the outside surface (11). The air passage (13) is defined coaxially through the body (10) and has an inside end and an interior thread (131). The inside end of the air passage (13) corresponds to the inside end (111) of the body (10). The interior thread (131) is defined at the inside end of the air passage (13).

The seal assembly is positioned around the outside surface (11) of the body (10) and has an outer washer (30), a seal (31), a backing ring (33) and an inner washer (32). The outer washer (30) is mounted around the outside surface (11) of the body (10) against the flange (12). The seal (31) is mounted around the outside surface (11) of the body (10) against the outer washer (30) and has a longitudinal neck (311). The inner washer (32) is slipped around the outside surface (11) of the body (10). The backing ring (33) is mounted to the inner washer (32).

The screw (20) is screwed into the inside end (111) of the body (10) and has a threaded shaft (21), a head (22) and a through hole (23). The threaded shaft (21) is screwed into the interior thread (131) in the air passage (13) in the body (10). The head (22) presses against the inner washer (32) and compresses the seal (31). Alternately, the inner washer (32) may be attached to or formed with the head (22). The through hole (23) is defined coaxially through the head (22) and the threaded shaft (21) and communicates with the air passage (13).

Figure 3:
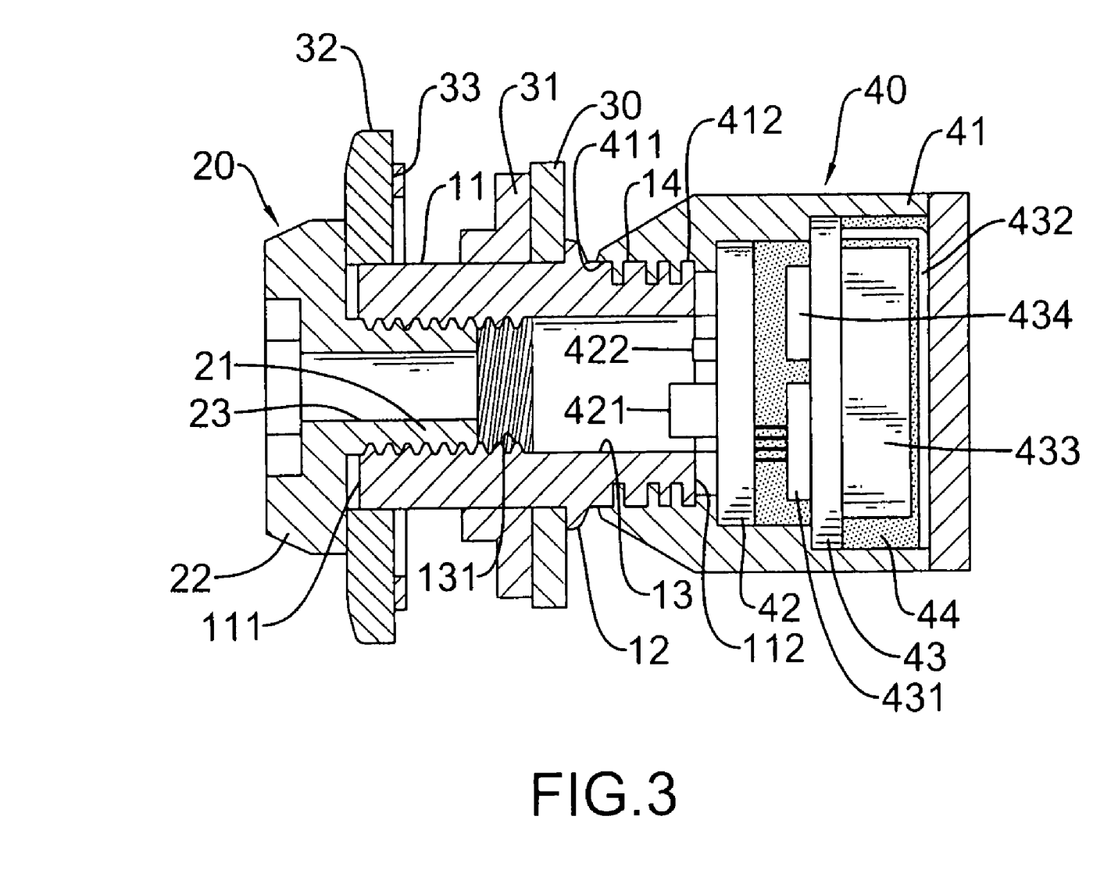
FIG. 3 is a cross sectional side view of the wireless tire-pressure monitor in FIG. 1.

With further reference to FIG. 3, the sensor (40) is mounted on the outside end (112) of the body (10) and has a casing (41), at least one circuit board (42, 43) and optional encapsulant (44). The casing (41) communicates with the air passage (13), has an opening (411) and interior ribs (412) defined in the opening (411) and secured onto the exterior ribs (14) on the outside surface (11) of the body (10) to securely seal the outside end (112) of the body (10). The casing (41) is made of plastic material. The at least one circuit board (42, 43) is mounted in the casing (41) and has a pressure detector (421), a temperature sensor (422), a microprocessor (431), a transmitter (434), an antenna (432) and a battery (433). The microprocessor (431) has multiple inputs and outputs, and the pressure detector (421) and the temperature sensor (422) are connected to the inputs of the microprocessor (431) and the transmitter (434) is connected to the outputs of the microprocessor (431). The antenna (432) is connected to the transmitter (434). The battery (433) is connected to the microprocessor (431), the pressure detector (421), the temperature sensor (422) and the transmitter (434). The first embodiment of the sensor (40) has a first circuit board (42) and a second circuit board (43). The second circuit board (43) mainly has the microprocessor (431), the transmitter (434), the antenna (432) and the battery (433), and the first circuit board (42) has a pressure detector (421) and a temperature sensor (422). The pressure detector (421) and the temperature sensor (422) are electrically connected to the microprocessor (431) of the other circuit board (43), and faced to the opening (411) and air passage (13) of the body (10). The encapsulant (44) encapsulates the at least one circuit board (42, 43).

Figure 4:
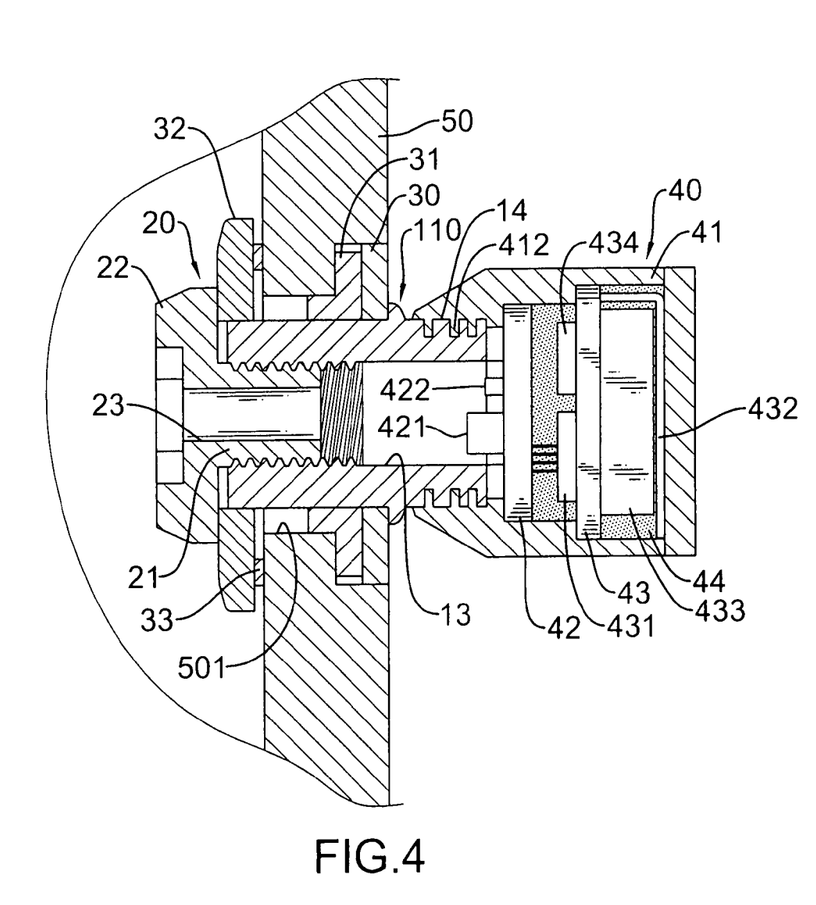
FIG. 4 is a cross sectional side view of the wireless tire-pressure monitor in FIG. 1 attached to a wheel rim.

With reference to FIG. 4, the first embodiment of the wireless tire-pressure monitor is mounted through a hole (501) in a wheel rim (50) having an inside surface and an outside surface. The screw (20), the inner washer (32) and the backing ring (33) are mounted against the inside surface of the wheel rim (50). The seal (31) and the backing ring (33) are mounted on opposite sides of the wheel rim (50). When the air passage (13) of the body (10) screws onto the threaded shaft (21) of the screw (20), the wheel rim (50) is squeezed between the seal (31) and the backing (33).

The sensor (40) will transmit detected signals from the pressure detector (421) and temperature sensor (422) to a receiver mounted inside the vehicle. The receiver will show information related to the pressure and temperature of the wheel to a driver.

Figure 5:
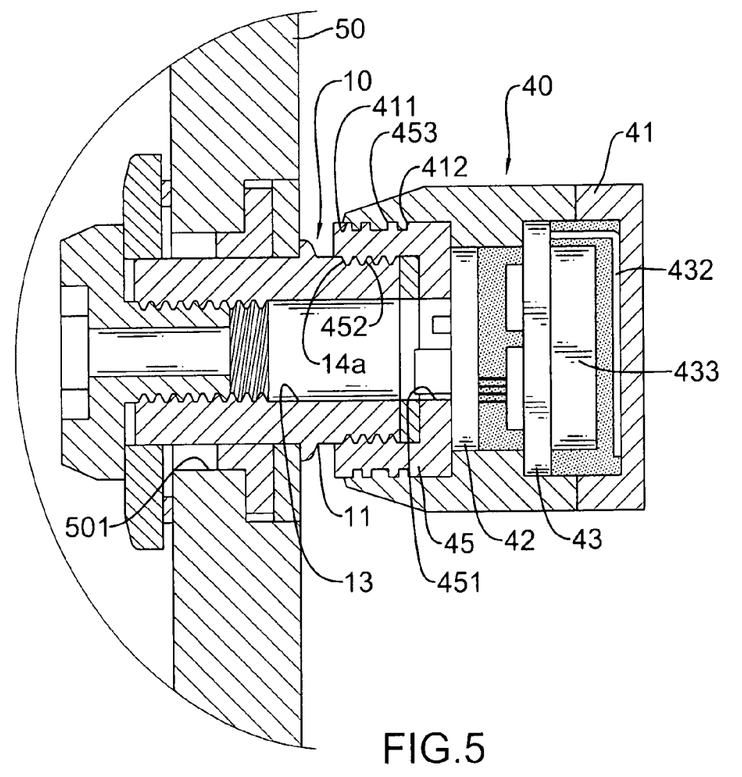
FIG. 5 is a cross sectional side view of a second embodiment of the wireless tire-pressure monitor attached to a wheel rim.

With reference to FIG. 5, a second embodiment of the wireless tire-pressure monitor in accordance with the present invention further includes a tubular gasket (45) and an exterior thread (14a) formed on the outside surface (11) at the outside end (112) of a body (10). The tubular gasket (45) has an opening (451), an interior thread (452) and exterior ribs (453). The tubular gasket (45) is secured into the opening (411) in the casing (41) and screwed onto the outside surface (11) of the body (10). Since the tubular gasket (45) is screwed onto the body (10), the sensor (40) can be directly separated from the body (10) without detaching the wheel (not shown) from the wheel rim (50). The opening (451) in the tubular gasket (45) allows that the air passage (13) of the body (10) to communicate with the casing (41). Therefore, the pressure detector (421) and the temperature sensor (422) detect the tire pressure and temperature inside the wheel.

Figure 6:
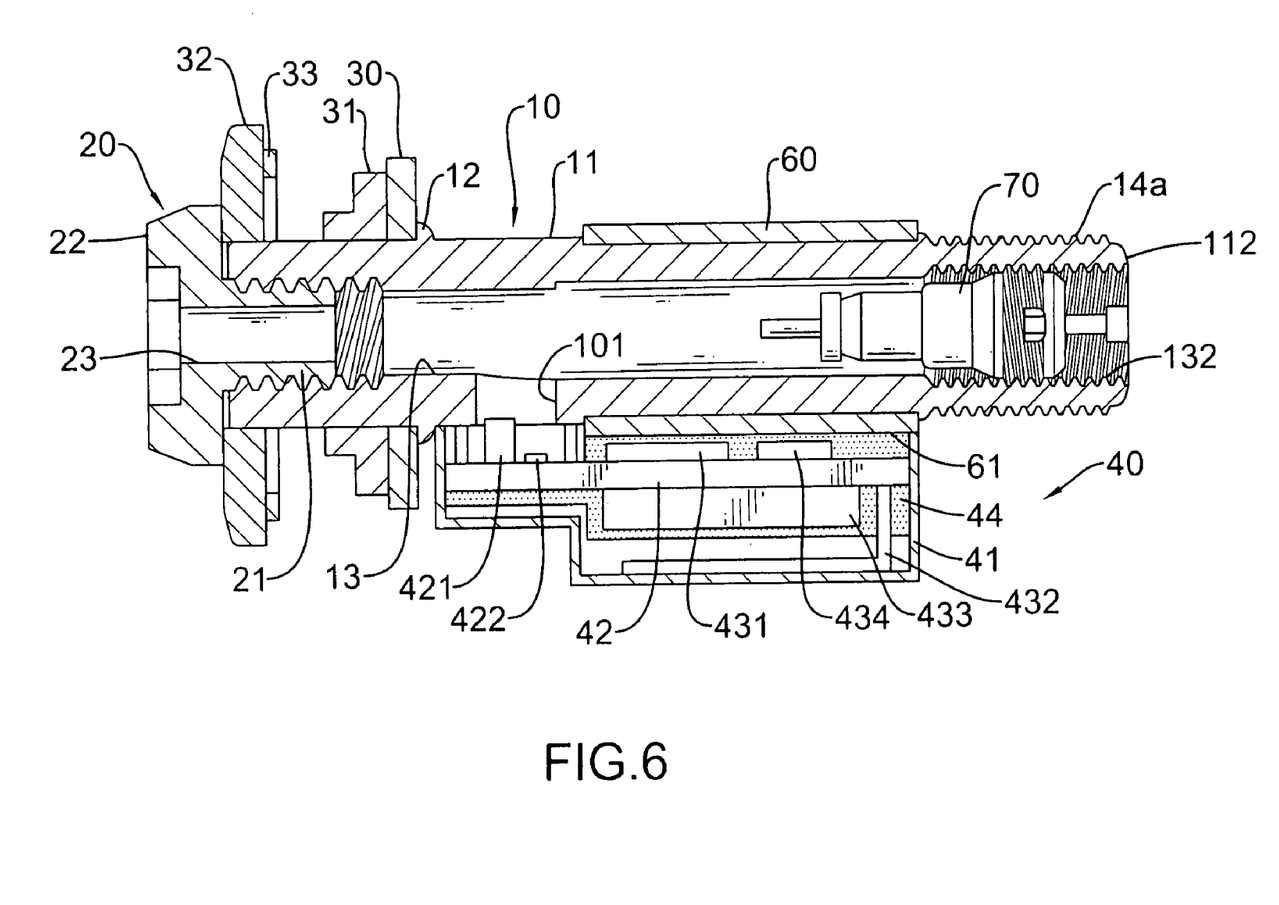
FIG. 6 is a cross sectional side view of a third embodiment of a wireless tire-pressure monitor in accordance with the present invention.

With reference to FIG. 6, a third embodiment of the wireless tire-pressure monitor in accordance with the present invention modifies the body (10) described in the first embodiment, incorporates a sleeve (60), rearranges the sensor (40) described in the first embodiment and incorporates a tire valve.

The body (10) is extended at the outside end (112) and a side opening (101) and an outer interior thread (132) are added. The side opening (101) is defined through the outside surface (11) and communicates with the air passage (13). The outer interior thread (132) is defined in the air passage (13).

The sleeve (60) is mounted around outside surface (11) the body (10) and has a flat seat (61).

The sensor (40) is mounted on the flat seat (61) of the sleeve (60) and on the outside surface (11) of the body (10) around the side opening (101) and has a casing (41), one circuit board (42) and optional encapsulant (44). The casing (41) communicates with the side opening (101). The pressure detector (421) and the temperature sensor (422) are mounted in the casing (41) and face to and communicate with the side opening (101) in the body (10). The valve core (70) is screwed into the air passage (13) of the body (10) to seal the outside end (112) of the body (10).

Figure 7:
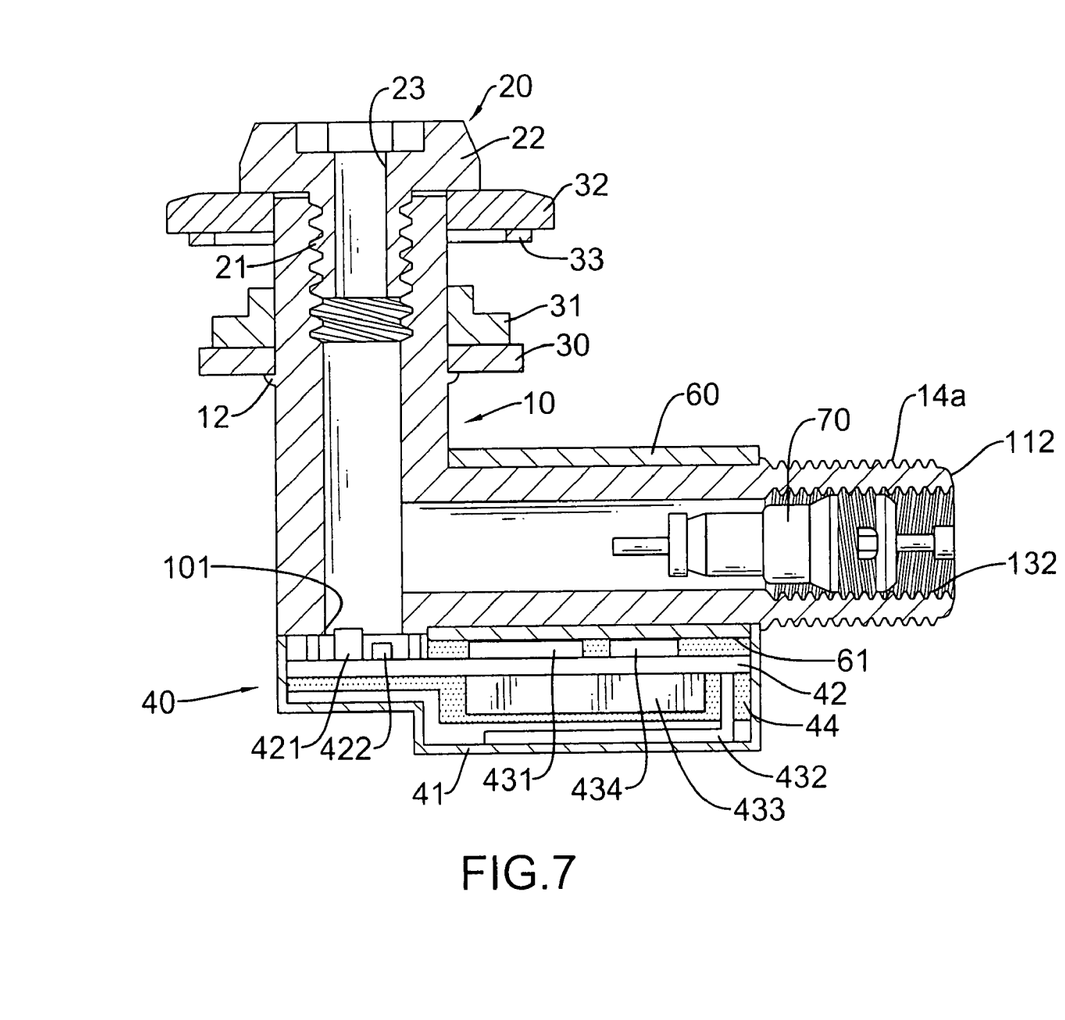
FIG. 7 is a cross sectional side view of a fourth embodiment of a wireless tire-pressure monitor in accordance with the present invention.

With reference to FIG. 7, a fourth embodiment of a wireless tire-pressure monitor in accordance with the present invention is essentially the same as the third embodiment, but the body (10) is L-shaped.

Figure 8:
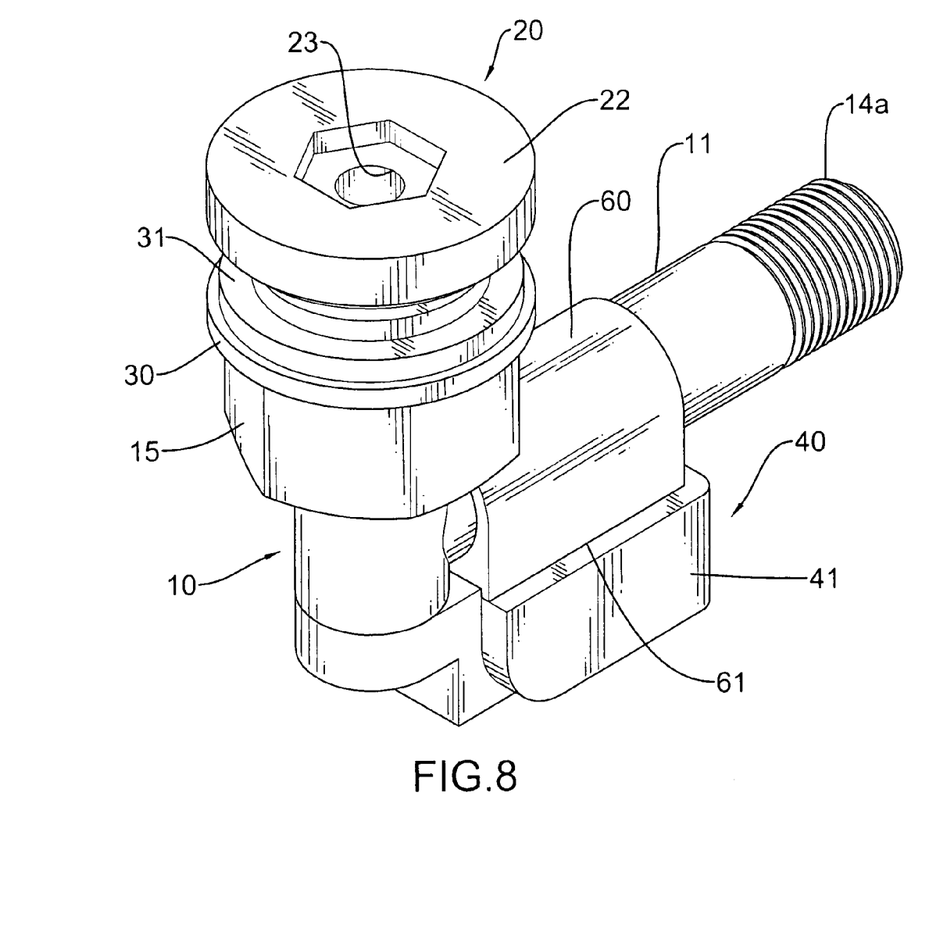
FIG. 8 is a perspective view of a fifth embodiment of a wireless tire-pressure monitor in accordance with the present invention.
Figure 9:
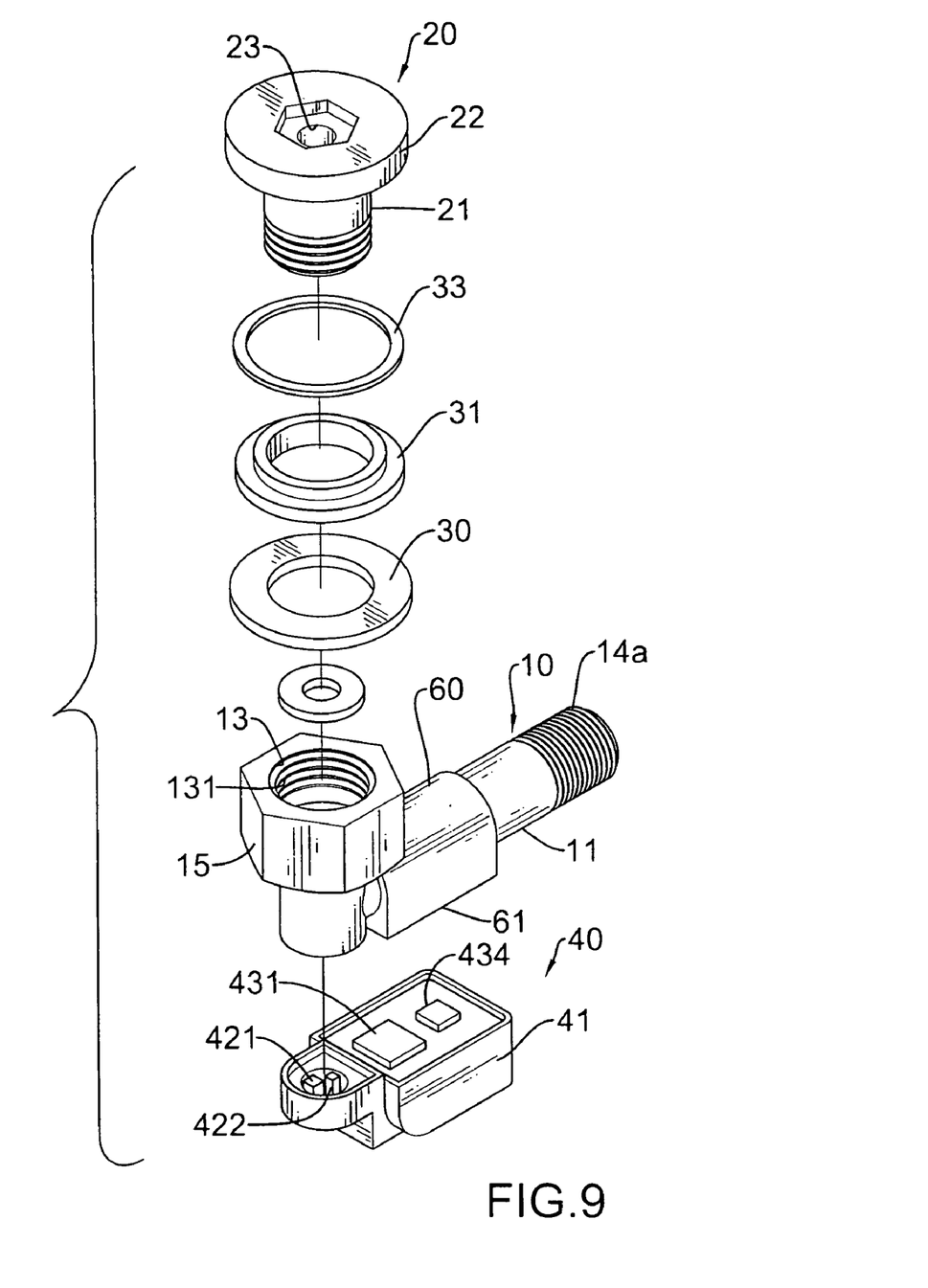
FIG. 9 is an exploded perspective view of the wire less tire-pressure monitor in FIG. 8.
Figure 10:
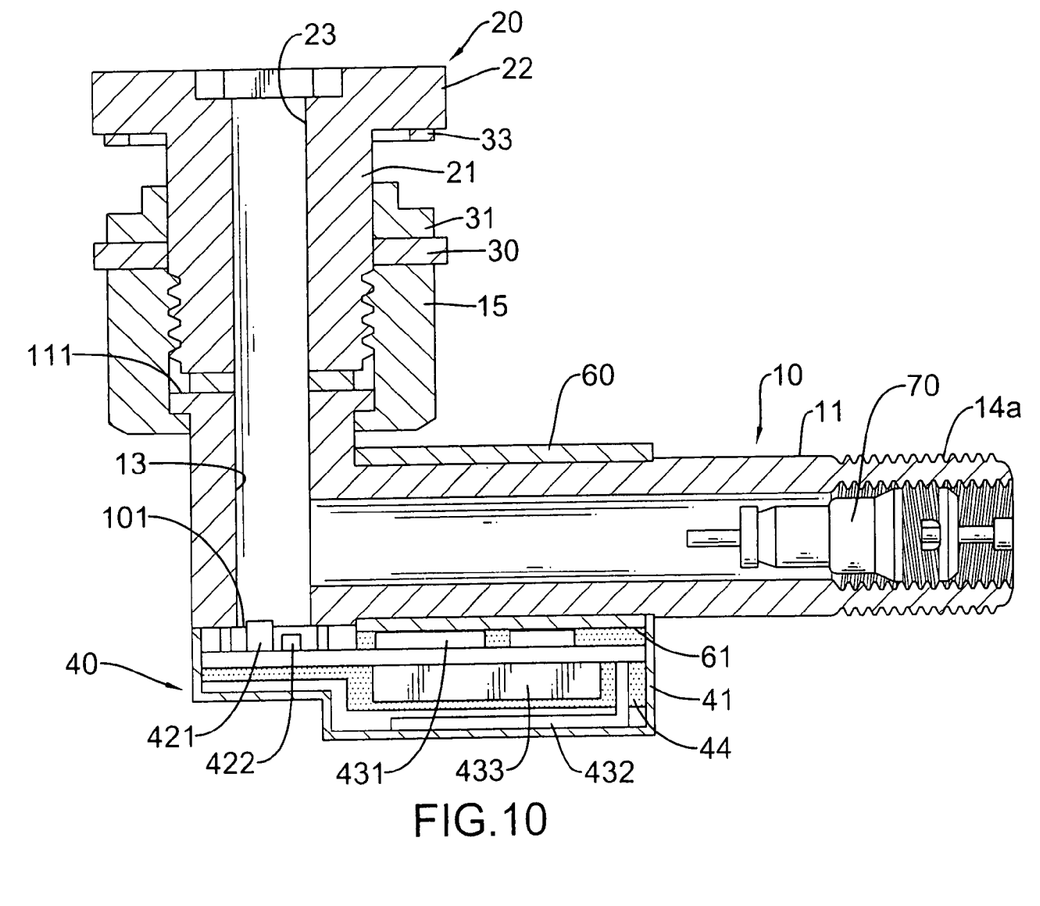
FIG. 10 is a cross sectional side view of the wireless tire-pressure monitor in FIG. 8.

With reference to FIGS. 8 and 9, a fifth embodiment of a wireless tire-pressure monitor in accordance with the present invention allows for installation on a wheel rim for a wheel having an inner tube. The wireless tire-pressure monitor has most elements of the fourth embodiment and does not have an inner washer (32). With further reference to FIG. 10, the body (10) further has a nut (15). The nut (15) is formed on the inside end (111) of the body (10) and has a top. The backing ring (33) is mounted on the head (22) of the screw (20), and the outer washer (30) is mounted on the top of the nut (15). The seal (31) is attached to the outer washer (30).

Figure 11:
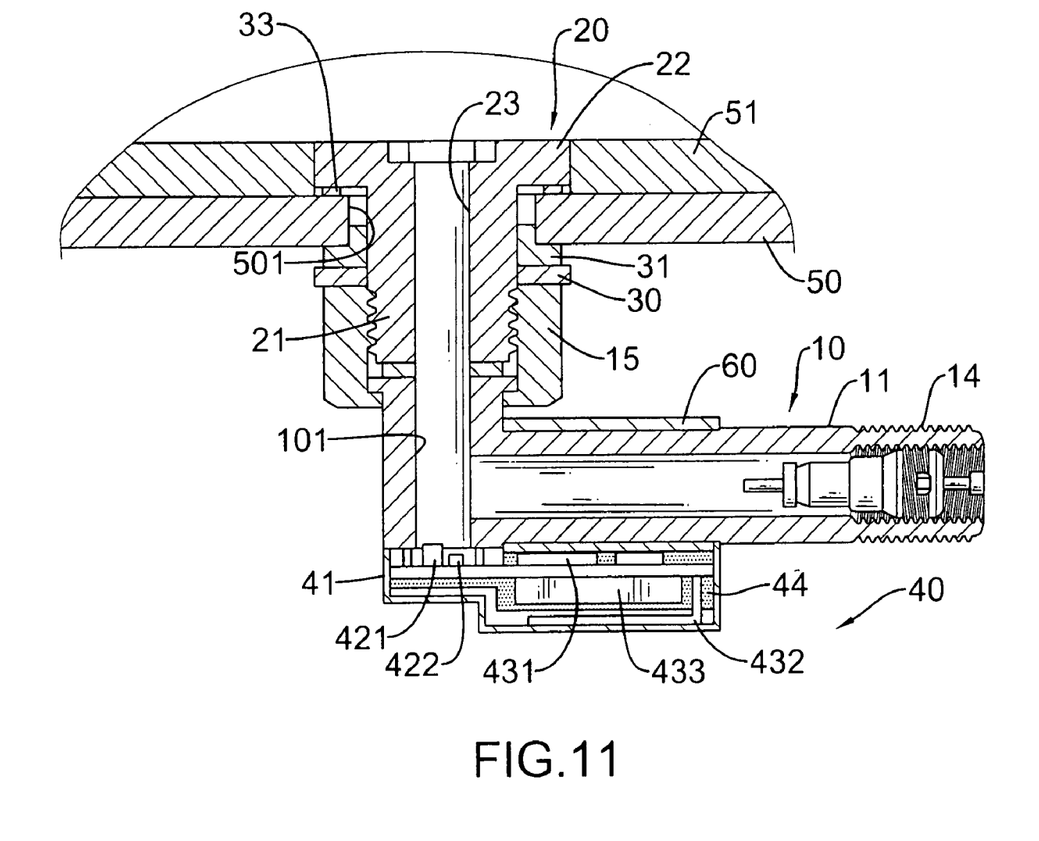
FIG. 11 is an operational cross sectional side view of the wireless tire-pressure monitor in FIG. 8 attached to a wheel rim with an inner tube of a tire.

With reference to FIG. 11, since this embodiment is adapted to attach to the wheel rim (50) for the wheel (not shown) having an inner tube (51), the screw (20) and the backing ring (33) are mounted to the inner tube (51) and the through hole (23) of the screw (20) communicates with inner space of the inner tube (51). When the inner tube (51) is attached into the wheel rim (50), the threaded shaft (21) is inserted into the hole (501) on the wall of wheel rim (50) and a front potion of the threaded shaft (21) is positioned outside of the wheel rim (50). The nut (15) further screws onto the threaded plug (21) to attach to the wheel rim (50). Therefore, the sensor (40) is mounted on outside of the wheel rim (50).

According to the forgoing embodiments of the present invention, during attaching the wheel on the wheel rim procedure, the sensor (40) is not damaged. Further, since the sensor (40) is positioned outside of the wheel rim (50) and the wireless detecting signals are not interfered by the wheel rim (50) or the intensity of the wireless detecting signals is decreased by the wheel rim (50) and wheel. Again, the wireless tire-pressure monitor in accordance with the present invention is easily and securely attached to the wheel rims to detect tire-pressure and temperature of the wheel. The sensor will detect and process the data inside the wheel and then convert and transmit the detected data as wireless signals. The receiver in the vehicle will receive the wireless signals and display the pressure and temperature information related to the wheel. Furthermore, the present invention can be configured to incorporate a tire valve without jeopardizing the structural integrity of the wireless tire-pressure monitor.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A wireless tire-pressure monitor, comprising:
   a body being cylindrical and having an outside surface, an inside end, an outside end, a flange formed on the outside surface, an exterior thread formed on the outside surface at the outside end, an air passage defined coaxially through the body, and a side opening defined through the outside surface and communicating with the air passage, wherein the air passage comprises:
   an inside end corresponding to the inside end of the body;
   an interior thread is defined at the inside end of the air passage; and
   an outer interior thread defined in the outside end of the air passage;
   a sleeve mounted around the outside surface of the body and having a flat seat;
   a seal assembly mounted around the outside surface of the body and having an outer washer mounted around the outside surface of the body against the flange, a seal mounted around the outside surface of the body against the outer washer and has a longitudinal neck, an inner washer slipped around the outside surface of the body, and a backing ring mounted to the inner washer; a screw screwed into the inside end of the body and having a threaded shaft screwed into the interior thread in the air passage in the body, a head pressing against the inner washer and compressing the seal, and a through hole defined coaxially through the head and the threaded shaft and communicating with the air passage;
   a sensor mounted on the sleeve and the outside surface of the body and having a casing mounted on the flat seat of the sleeve and the outside surface of the body around and communicating with the side opening in the body and at least one circuit board mounted in the casing; and
   a valve core screwed into the interior thread at the outside end of the air passage.

2. The wireless tire-pressure monitor as claimed in claim 1, wherein the at least one circuit board comprises:
   a microprocessor having multiple inputs and outputs;
   a pressure detector connected to the input of the microprocessor and faced to the opening of the casing to detect, wherein the opening communicates to the air passage, so the pressure detector detects the tire pressure of a wheel;
   a temperature sensor connected to the input of the microprocessor and faced to the opening of the casing to detect, wherein the opening communicates to the air passage, so the temperature sensor detects the tire temperature of a wheel;
   a transmitter connected to the output of the microprocessor;
   an antenna connected to the transmitter; and
   a battery connected to the microprocessor, the pressure detector, the temperature sensor and the transmitter.

3. The wireless tire-pressure monitor as claimed in claim 2, wherein the sensor casing has encapsulant encapsulating the at least one circuit board.

4. The wireless tire-pressure monitor as claimed in claim 1, wherein the body is L-shaped.

5. A wireless tire-pressure monitor, comprising:
   a body being an L-shaped cylinder and having an outside surface, an inside end, an outside end, a nut formed on the inside end of the body and having a top, an L-shaped air passage defined coaxially through the body, an exterior thread defined on the outside surface at the outside end, an outer interior thread defined in the outside end of the body, and a side opening defined through the outside surface and communicating with the air passage;
   a sleeve mounted around the outside surface of the body and having a flat seat;
   a screw screwed into the nut on the inside end of the body and having a threaded shaft screwed into the nut, a head and a through hole defined coaxially through the head and the threaded shaft and communicating with the air passage;
   a seal assembly having an outer washer mounted on the top of the nut, a seal attached to the outer washer and having a longitudinal neck, and a backing ring mounted on the head of the screw;
   a sensor having a casing mounted on the flat seat of the sleeve and communicating with the side opening in the body and at least one circuit board mounted in the casing; and
   a valve core screwed into the outer interior thread at the outside end of the air passage.

6. The wireless tire-pressure monitor as claimed in claim 5, wherein the at least one circuit board comprises:
   a microprocessor having multiple inputs and outputs;
   a pressure detector connected to the input of the microprocessor and faced to the opening of the casing to detect, wherein the opening communicates to the air passage, so the pressure detector detects the tire pressure of a wheel;

a temperature sensor connected to the input of the microprocessor and faced to the opening of the casing to detect, wherein the opening communicates to the air passage, so the temperature sensor detects the tire temperature of a wheel;

a transmitter connected to the input of the microprocessor;

an antenna connected to the transmitter; and a battery connected to the microprocessor, the pressure detector, the temperature sensor and the transmitter.

7. The wireless tire-pressure monitor as claimed in claim 6, wherein the sensor casing has encapsulant encapsulating the at least one circuit board.

* * * * *